United States Patent
Ofer et al.

[19]

[11] Patent Number: 5,890,204
[45] Date of Patent: Mar. 30, 1999

[54] USER CONTROLLED STORAGE CONFIGURATION USING GRAPHICAL USER INTERFACE

[75] Inventors: Erez Ofer, Brookline; John Stephen Copley, Hopkinton; Joseph G. Murphy, Westford, all of Mass.

[73] Assignee: EMC Corporation, Hopkinton, Mass.

[21] Appl. No.: 657,337

[22] Filed: Jun. 3, 1996

[51] Int. Cl.⁶ .................................................. G06F 11/00
[52] U.S. Cl. ........................... 711/111; 711/114; 711/100
[58] Field of Search ........................... 711/114, 111, 112, 711/100; 395/830, 831

[56] References Cited

U.S. PATENT DOCUMENTS

| | | | |
|---|---|---|---|
| 5,233,692 | 8/1993 | Gajjar et al. | 395/309 |
| 5,574,851 | 11/1996 | Rathunde | 395/182.05 |
| 5,602,667 | 2/1997 | Patel | 359/161 |

OTHER PUBLICATIONS

Crowther et al., "RAID Technology Advances to the Next Level", Computer Technology Review, vol. 16, issue 3, (p. 46, 5th column, line 1), Mar. 1, 1996.

Richman, Dan, "Tivoli Rolls Out Timesaving Tool For Sysadmins", UNIX Today, ISSN 1040–5038, p. 46, Dec. 9, 1991.

*Primary Examiner*—Tod R. Swann
*Assistant Examiner*—Felix B. Lee
*Attorney, Agent, or Firm*—Fish & Richardson, P.C.

[57] ABSTRACT

A method and apparatus for configuring a mass storage system, in which an array of disk storage devices connect to a storage controller and a plurality of host computers also connect to the storage controller, provide the capability, using a convenient graphical user interface at the host computer, for enabling the user at the host computer to determine the status and configuration of the system. The user can also, using the graphical user interface, modify the system status or configuration. Various graphical user interface techniques can be used including "click and drag" and other user friendly presentations and operations. The system uses either proprietary communications channels between disk drive controller and host computer, or modifies standard protocols in order to enable the necessary communications to occur.

10 Claims, 4 Drawing Sheets

'SEND DIAGNOSTICS' ID'

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 | COMMAND CODE  $1D ||||||||
| BYTE 1 | LOGGICAL UNIT NUMBER ||| PF | R | SELFTST | DEVOFL | UNITOFL |
| BYTE 2 | CKD | CHAIN | WRITE | FEATURE FLAGS |||||
| BYTE 3 | PARAMETERS LENGTH MSB ||||||||
| BYTE 4 | PARAMETERS LENGTH LSB ||||||||
| BYTE 5 | CONTROL BYTE ||||||||

FIG. 2A

'SEND DIAGNOSTICS'  PARAMETER HEADER  (LENGTH 8)

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 - 2 | PASSWORD 'EMC' ||||||||
| BYTE 3 | FEATURE NUMBER   (ABOVE LIST) ||||||||
| BYTE 4 - 5 | CHAIN CODE   (AGAINST MIXING JOBS) ||||||||
| BYTE 6 - 7 | EXTRA PARAMETERS LENGTH ||||||||

FIG. 2B

'SEND DIAGNOSTICS'  PARAMETER  (LENGTH N)

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 - N-1 | PARAMETERS / DATA ||||||||

FIG. 2C

RECEIVE DIAGNOSTIC RESULTS  '1C'

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 | COMMAND CODE  $1C ||||||||
| BYTE 1 | LOGGICAL UNIT NUMBER ||| RESERVD |||||
| BYTE 2 | CKD | E CHN | READ | SENSE | FEATURE FLAGS ||||
| BYTE 3 | PARAMETERS LENGTH MSB ||||||||
| BYTE 4 | PARAMETERS LENGTH LSB ||||||||
| BYTE 5 | CONTROL BYTE ||||||||

FIG. 2D

RECEIVE DIAGNOSTIC RESULTS   PARAMETER HEADER  (LENGTH 8)

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 | RETURN CODE ||||||||
| BYTE 1 - 2 | RETURN CODE MODIFIERS ||||||||
| BYTE 3 | FEATURE NUMBER   (ABOVE LIST) ||||||||
| BYTE 4 - 5 | CHAIN CODE  (AGAINST MIXING JOBS) ||||||||
| BYTE 6 - 7 | EXTRA PARAMETERS LENGTH ||||||||

FIG. 2E

RECEIVE DIAGNOSTIC RESULTS   PARAMETER (LENGTH N)

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 - N-1 | PARAMETERS / DATA ||||||||

FIG. 2F

| BYTES \ BITS | BIT 7 | BIT 6 | BIT 5 | BIT 4 | BIT 3 | BIT 2 | BIT 1 | BIT 0 |
|---|---|---|---|---|---|---|---|---|
| BYTE 0 | COMMAND $28 ||||||||
| BYTE 1 | LOGICAL UNIT NUMBER ||| DPO | FUA | RT | RTI | RELADR |
| BYTE 2 - 5 | LOGICAL BLOCK ADDRESS ||||||||
| BYTE 6 | SESSION ID ||||||||
| BYTE 7 - 8 | TRANSFER LENGTH ||||||||
| BYTE 9 | CONTROL BYTE ||||||||

FIG. 2G

USER CONTROLLED STORAGE CONFIGURATION USING GRAPHICAL USER INTERFACE

The invention relates generally to mass storage systems, and in particular, to the control functions between the host computer and the mass storage controller.

To meet the growing requirements of today's computer systems, and, simultaneously, to satisfy the growing demands of customers to have more control over their mass storage systems, it has become desirable to provide customers with the ability to communicate, through the host, with the mass storage controller, and further, to modify the controller's characteristics and configuration. Previously, such control capability was available only to a customer engineer travelling to the site, or through a modem connection between a central service bureau location and the customer site. In the former instance, the customer engineer, at the site, would communicate with the controller to both diagnose and correct problems at the controller as well as modify or otherwise affect the various functional and configurational aspects of controller operation. In the later instance, a service engineer at the remote service site effects the same operations, through a modem connection to a personnel computer at the customer site.

While the traditional approach, whereby diagnostic and corrective action was taken by the customer engineer sitting either at the user's site, or at a central service bureau, was effective to implement all necessary procedures, nevertheless users have consistently urged and requested the ability to perform some of those same functions themselves, for example the ability to affect operation of the mass storage controller as it interfaces with a plurality of disk drives.

At the same time, however, the need for using standard, industry recognized, non-proprietary systems and protocols for communications between the controller and the host continues to grow. Such standards based systems, for example the use of a SCSI protocol, are well defined for communications between host and disk drive. However, the ability to add special function commands to the SCSI protocol, for example, is not intended by the protocol itself.

SUMMARY OF THE INVENTION

The invention relates to a method and apparatus for effecting communications between a host processor and a mass storage controller.

The invention relates to a method and apparatus for configuring a mass storage system, the system having a disk storage controller for receiving and sending data from and to a disk array, and for receiving and sending data and commands from and to at least one host computer. The host computer is connected to the disk controller and the disk controller is able to configure the array in response to manually entered or modem entered commands from a personal computer.

The method features the steps of communicating data from the host computer to the storage controller for storage in the storage array, presenting to a user at the host computer, at a graphical user interface (GUI), a pictorial representation of interconnections between ports connected to the host computer and ports connected to the disk array, enabling a user to modify the pictorial representation at the host to reconfigure the connections to the host computer and disk array, communicating the modified configuration to the storage controller, and implementing, at the storage controller, the modified disk array configuration.

In a particular aspect of the invention, the communicating step further features the step of using a modified diagnostic command of a bus protocol for a bus connecting the storage controller and the host computer, to communicate the modified configuration from the host computer to the storage controller, and storing the modified configuration at the storage controller prior to the implementing step.

BRIEF DESCRIPTION OF THE DRAWING

Other features and advantages of the invention will be apparent from the following drawings, taken together with the description of the particular embodiments of the invention, in which:

FIGS. 2A–2G represent a series of DIAGNOSTIC SEND and RECEIVE protocols using modified SCSI commands;

DESCRIPTION OF THE PREFERRED EMBODIMENTS

Figure 1:
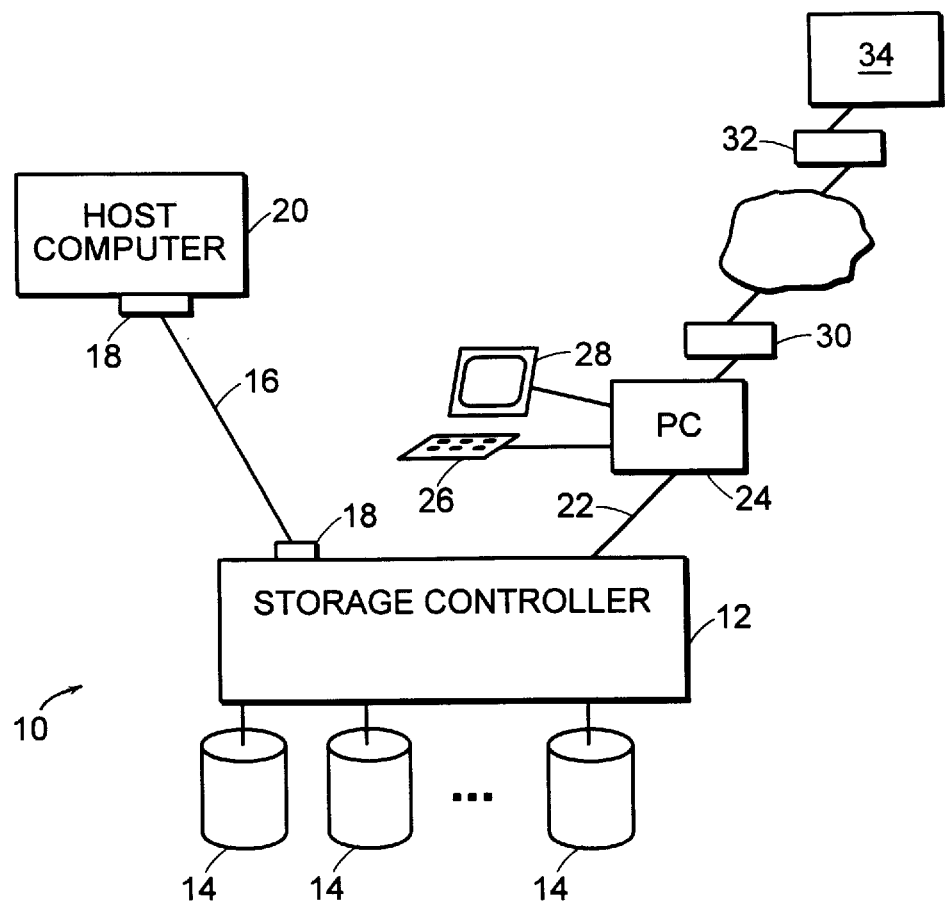
FIG. 1 is a diagrammatic block diagram of a mass storage system with which the invention is useful.

Referring to FIG. 1, a mass storage system 10 in accordance with the invention, has a storage controller 12 connected to a plurality of storage devices, here an array of disk storage devices 14. The storage controller 12 is connected, over a standard communications channel 16, here a SCSI bus, through appropriate terminators 18 to a host computer 20. The storage controller 12 is also connected over a communications path 22 to a personal computer (PC) 24. The personal computer has both a keyboard 26 and a display 28. The keyboard 26 can be used by service personnel to enter configuration, diagnostic, status, correction, and other commands to the PC for controlling the functionality, structure and configuration, and status of the storage controller 12. The PC is also connected through a modem 30 to a remote service bureau having a modem 32. The remote service bureau has a remote site computer system 34, which can be, for example, a PC or a workstation, through which commands are entered and by which the PC 24 is operated to control the storage controller 12.

Accordingly, when service is requested by the user through a remote service site or a customer engineer appearing at the user site, the PC 24 always acts as the source of the command data to the controller and the commands are sent to the storage controller over communication bus lines 22. Since communication bus 22 is implemented specifically to provide a command structure between the PC and the controller, both of which are configured by the same vendor, there is no difficulty in designing that communications structure to incorporate the varying commands necessary to properly diagnose, control, and configure the storage controller. Thus, various commands which, for example, set the array "RAID" configuration, the block size, logical volumes, disk adaptor and channel adaptor software configurations and mappings, etc., which are typical in a storage controller such as that manufactured by EMC Corporation, the assignee of this application, under the trademark Symmetrix, are well known and established in the art. From the perspective of the storage controller, it is immaterial whether the data and command entry is performed from the PC keyboard 26 or through the modem 30 from the remote site computer 34.

In accordance with a preferred embodiment of the invention, and as desired for industry compatibility, the bus 16 between the host and the storage controller is a standard bus, a SCSI bus operating in accordance with the SCSI protocol being described in connection with the illustrated embodiment of the invention. (Other standard buses could be used.) This protocol does not provide for commands particularly useful in operating the storage controller (as opposed to transferring data to and from a disk drive) such as commands for reconfiguring the storage, a SCSI adaptor write protection command, commands identifying events to be alerted for, commands for Receive Diagnostic Function (RDF) contention, commands for statistics monitoring, etc.

Since the SCSI protocol does not provide commands for these special functions, a different communication mechanism, or an additional communication mechanism needed to be found. In accordance with the invention, therefore, and in accordance with the illustrated SCSI protocol, a series of special command functions are implemented, which are both compatible with the bus protocol and yet are not part of the protocol. The illustrated embodiment of the invention employs a modification of the SEND DIAGNOSTIC command to implement a plurality of special features commands which are available for transmission from the host to the storage controller 12 and to which the storage controller will respond using a modified set of the RECEIVE DIAGNOSTIC RESULTS command.

In accordance with a particular embodiment of the invention, the features which are preferably implemented are: a "get controller data" command which responds to the host's questions about the controller configuration, that is, the configuration of the controllers, devices, cache, etc.; and the controller "inlines" command which implements the controller "inlines" with the same specifications and parameters format as the controller. The controller can be, for example, an EMC Corporation Symmetrix controller.

The process of communications, in accordance with the invention, will generally be performed using two commands linked together. The host computer will send a SEND DIAGNOSTICS command with a header of data and a request for information. If the command requests data or calls for execution of a function, the first command will be linked to a RECEIVE DIAGNOSTIC RESULTS command which provides the results, and which includes a response header and the response data. If the requesting command sends data to the controller, the first command will be linked to another "SEND DIAGNOSTICS" command which will include a header followed by the data.

Referring now to FIG. 2A, the format of the SEND DIAGNOSTICS command (command code "1D"), is illustrated. In this command, which meets the formal SCSI definition, elements "PF" and the "SELFTST" are set equal to zero, and the PARAMETERS LENGTH is set equal to the value 8. These elements are diagrammatically illustrated in FIGS. 2B and 2C.

Referring to FIG. 2D, the RECEIVE DIAGNOSTIC results, command code "1C", is a formal SCSI definition, and uses a PARAMETERS LENGTH equal to "8". Like the SEND DIAGNOSTICS command, the RECEIVE DIAGNOSTIC RESULTS command has a parameter header as illustrated in FIG. 2E as well as a RESULTS PARAMETER illustrated in FIG. 2F for results and data.

Considering the special features commands implemented by the SEND DIAGNOSTICS command in more detail, Feature 0, the "Get Controller Data" command, responds to host questions about the real controller configuration. Command Feature 1, the Controller Inline command, implements the Controller Inlines with the same specification and parameters format. Every command with this feature actually consists of two commands linked together. The first always is the SEND DIAGNOSTICS command with the flag "UNITOFL" set to zero. After the header with this feature number, the host sends 16 bytes of parameters. If the request is for the controller to write data, the second linked "SEND DIAGNOSTICS" SCSI command has the flag "UNITOFL" set to one, and it will have the same header. The data that follows will be with a count according to the first command parameters.

If the request is to read data, the second linked command, "RECEIVED DIAGNOSTIC RESULTS", will have a header and the data that follows will have a count according to the first command parameters. If a utility or test is requested by the first command, the second command will disconnect, execute the requested utility or test, and then return the header in the RECEIVE DIAGNOSTIC RESULTS command with a return code.

Accordingly, the illustrated embodiment of the invention advantageously transmits a full complement of commands over the standard SCSI interface by configuring certain of the SCSI diagnostic commands in a manner recognizable by the host and storage controllers as "a special feature group" of commands which enable what is effectively a side channel communications path, operating at high speed, that is, at SCSI speeds. This enables a full range of host activity to take place wherein the host can control various functions of the controller not otherwise available to the host over a standard SCSI interface. These commands include, for example, the ability to ascertain the configuration of the storage controller and its storage elements, the ability to control reservations made by a host at the storage controller, the ability to vary the storage configuration and effect adaptive storage in accordance with the host needs, a SCSI Adapter write protection, the ability of the host to ascertain "event alerts" which occur at the storage controller, and the ability to effect remote disk functions and to control them from the host as opposed to operating through the proprietary channel 22, from the PC. Other functions of course can also be effected.

Being able to use the host computer to communicate commands and related data (including status and configuration information) under user control enables the user to perform significant controller operations from the host computer. Equally important to the ability to perform the operations at the host, is the ability to perform them quickly and easily, without becoming mired in the internal details of machine operation. In other words, a user, at the host computer, should not have to become a customer engineer to perform significant functions which affect operation of the system.

Figure 3:
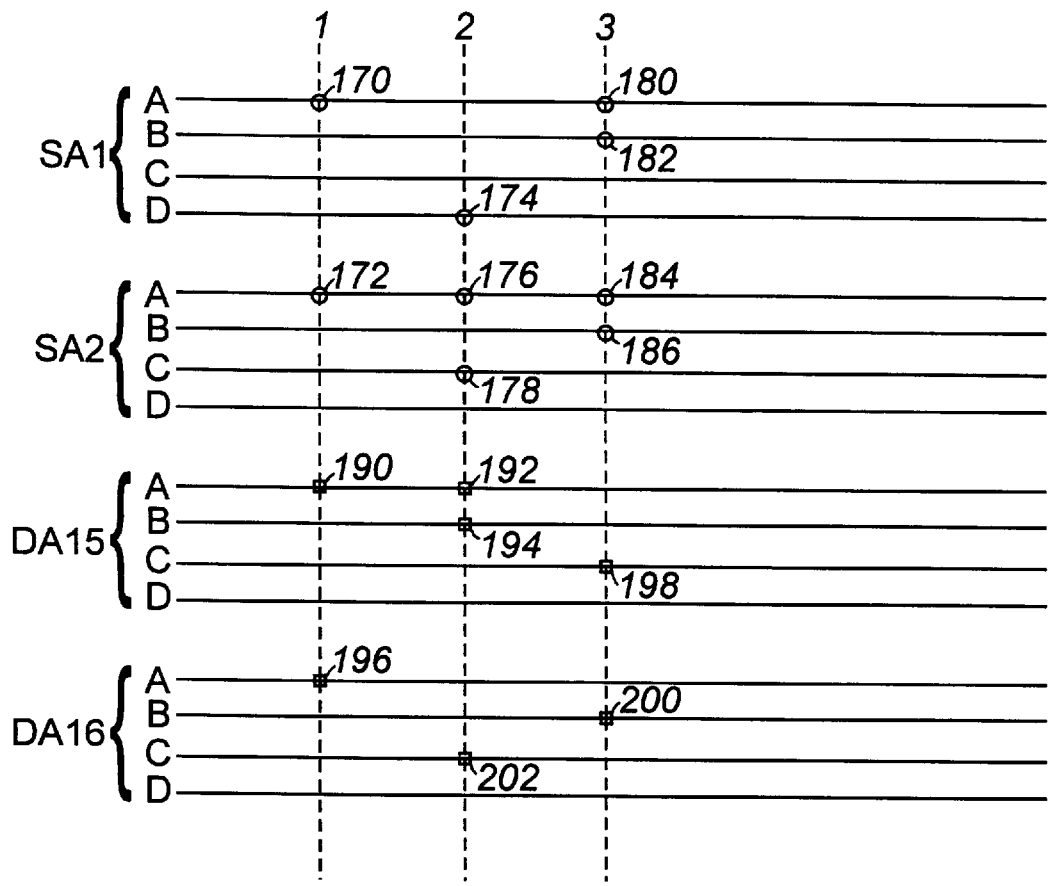
FIG. 3 is an interconnection GUI representation in accordance with the invention.

In particular, the ability to obtain a configuration mapping showing the interconnections of the storage devices and the host ports at the storage controller, and to easily modify those connections using a convenient graphical user interface at the host computer, enables a user to modify, on the fly, the entire logical structure of the disk storage system. Referring to FIG. 3, according to a preferred embodiment of the invention, the host computer issues a configuration request to the storage controller and receives from the storage controller the necessary information to generate, preferably graphically, a representation of the logical interconnection between the disk drives and the bus adapters (often referred to as channel adapters) using the storage controller as the interconnection medium. Thus, referring to FIG. 3 in one particular embodiment of the invention, the graphical user interface shows initially the interconnections between the varying components of the mass storage system. There is illustrated a system having (in the illustrated embodiment, using the SCSI bus as the standard bus) two SCSI bus adapters designated SA1 and SA2, each of which can have up to four ports labeled A, B, C, and D. Each of the ports connects to a different host computer thus allowing, in this illustrated embodiment, up to eight host computers to communicate with the system storage controller. In addition, each storage controller has two disk adapter boards labelled DA15 and DA16, each board able to connect to four disk drives labeled A, B, C, and D. Thus, the storage controller controls up to, in this particular illustrated embodiment, eight disk drive units, although in other embodiments of the invention more or less hosts can communicate with more or less disk drives. Internal to the controller is a connection bus having a plurality of different connections, the vertical lines in FIG. 3 labelled 1, 2, 3, . . . . These lines graphically represent and identify the interconnections of the host SCSI ports to disk drive elements using the circled intersections such as intersections 170, 172, 174, 176, 178, 180, 182, 184, and 186. Correspondingly, the interconnections illustrated at the adapter ports and indicated by square elements 190, 192, 194, 196, 198, 200, and 202 indicate the connections to the various disk drives available to the storage device. Thus, with regard to FIG. 3, the disk drives connected at port A for each of disk adapters 15 and 16 are each accessible to the host computers connected to ports A of the SCSI adapters 1 and 2. This is indicated by the interconnections 170, 172, 190, 196. Similarly, the disk drive connected to port C of disk adapter 16 is accessible to the host computers connected to port D of SCSI adaptor 1 (SA1) and ports A and C to SCSI adapter 2 (SA2). In a similar manner, the configuration of the entire storage subsystem is illustrated by the graphic user interface presented in FIG. 3.

In this illustrated embodiment of the invention, the vertical dashed lines 1, 2, . . . 6, as shown in FIG. 3, represent not only a method of identifying the communication paths from host port to disk port, but further can be used to identify the nature of the access. For example, each vertical line can correspond not to a full disk drive access, but only a partial access, such as to one or more logical volumes associated with a disk drive. This limited access will become more common as disk drives grow in size and a host computer, for example, need not have access to the entire drive.

Referring again to FIG. 3, in accordance with the invention, the user at the display terminal connected to the host, can "click and drag," delete, or add a connection point being displayed to modify the configuration of the disk drive mass storage system. Accordingly, an interconnection, for example, 170, can be deleted, or can be moved to a different port of SCSI adapter 1 (SA1). Similarly, new connections can be inserted graphically into the display configuration illustrated in FIG. 3.

Once the new configuration is considered final, in accordance with the invention, the new configuration is transmitted using a SEND DIAGNOSTIC command sequence to the disk storage controller. At the controller, the configuration is stored in memory, for example EPROM, and only thereafter, and in response to another command from the user, is the configuration actually implemented in the system. When the new configuration is implemented, a flag (mailbox bit) is set in global memory, to be read by the PC 24 the next time it addresses the storage controller so that the PC status identifying the configuration of the controller will be updated to match the actual configuration.

It is important to ensure that the user perform various status checks prior to changing the configuration of the mass storage system. In this respect, the user must be certain that the disk drive interconnection being moved or deleted from one host is not required by that host, and does not contain data which a user at that host may need at a later time, or is using in the current time frame. Similarly, the user must be careful that various disk drives, when moved from access by one host to another host is able to handle the volume required by its new configuration.

As noted above, in FIG. 3, each of the dashed vertical lines can represent a logical volume in the mass storage array. Accordingly, therefore, rather than moving the connections between the whole physical drive, if the vertical lines represent logical volumes, the connections effectively identify which logical volumes a host computer can access. As a result, the user at one host can connect another host to differing logical volumes thereby enabling the user to have complete reconfiguration control using the graphical user interface.

Figure 4:
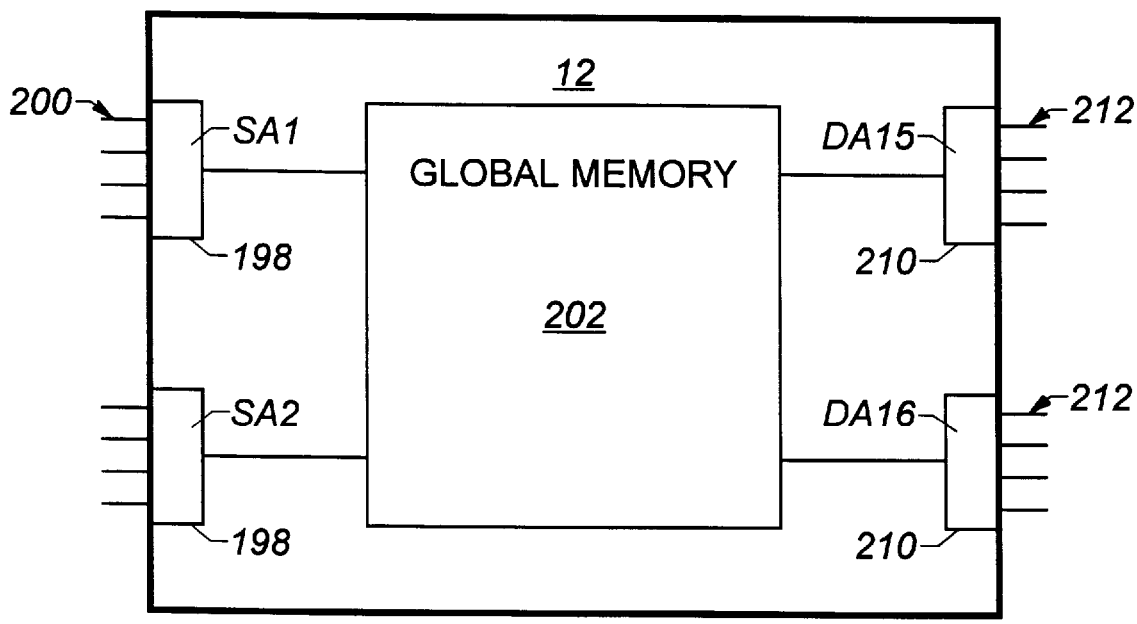
FIG. 4 is a more detailed block diagram of the storage controller.

Referring now to FIG. 4, in a preferred embodiment of the storage controller, such as that implemented in the EMC Symmetrix storage controller, the communications bus to which the host computer is attached is connected to a channel adapter 198 (an SCSI adapter when the communications bus is a SCSI bus) which receives the communications over communications path 200. The channel adapter connects to and communicates through a global memory 202, a portion of which is reserved for interport communications. This portion of global memory acts much like a mailbox, with messages being placed in the mailbox for later collection by another device. Some of the mailbox protocol enables the setting of bits in order to advise a device at another port to read one or more portions of the global memory to determine, for example, new configuration data, statistics, recent events, etc. The disk array is also connected to the global memory. In the illustrated embodiment of the invention, the disk array is connected through disk adapters 210 which connect to global memory, on the one hand, and through ports 212 to the disk array.

In the illustrated embodiment of the invention, not only can a graphical user interface be used to change the configuration of the system, in connection with FIG. 3, but in addition, the user at the host computer can also change, for example, the RAID configuration for implementation by the storage controller. The user at the host computer needs to be careful, in changing the RAID configuration, not to perform operations which might adversely affect another host computer, or data stored on the disk drives.

In another embodiment of the invention, wherein the bus protocol is a SCSI bus protocol, a host computer can place a reservation, over the SCSI bus, as is well known in the art. If the host computer were to fail, however, the reservation which was made, under normal circumstances, cannot be broken or removed from the system. In accordance with the illustrated embodiment of the invention, the user at another host computer, using the tools available at the graphical user interface, is able to cancel the reservation made by the now non-operative host computer, and thereby free up the time/drives which had been "reserved."

Additions, subtractions, and other modifications of the disclosed invention will be apparent to those practiced in the field and are within the scope of the following claims.

What is claimed is:

1. A method of configuring a mass storage system, the system having a disk storage controller for receiving and sending data from and to a disk array and for receiving and sending data and commands from and to a host computer, the host computer being connected to the disk controller, and the disk controller being able to configure the array in response to manually entered and modem entered commands from a personal computer, the method comprising the steps of:

communicating data from a host computer to said storage controller for storage in said storage array, presenting to a user at said host computer, at a graphical user interface, a pictorial representation of interconnections between ports connected to the host computer and ports connected to the disk array, enabling a user to modify the pictorial representation at the host to reconfigure the connections to the host computer and disk array, communicating the modified configuration to the storage controller, and implementing, in the storage controller, the modified disk array configuration.

2. A method of configuring a mass storage system, the system having a disk storage controller for receiving and sending data from and to a disk array and for receiving and sending data and commands from and to a host computer, the host computer being connected to the disk controller, and the disk controller being able to configure the array in response to manually entered and modem entered commands from a personal computer, the method comprising the steps of:

communicating data from a host computer to said storage controller for storage in said storage array, presenting to a user at said host computer, at a graphical user interface, a pictorial representation of interconnections between ports connected to the host computer and ports connected to the disk array, enabling a user to modify the pictorial representation at the host to reconfigure the connections to the host computer and disk array, communicating the modified configuration to the storage controller, using a modified diagnostic command of a bus protocol for a bus connecting the storage controller and the host, to communicate the modified configuration from host to controller, implementing, in the storage controller, the modified disk array configuration, and storing the modified configuration at the storage controller prior to said implementing step.

3. The method of claim 2 further comprising the step of:

updating, at the storage controller, the implemented modified configuration.

4. The method of claim 3 further comprising the step of:

storing at the controller and at the host computer a copy of the disk configuration.

5. The method of claim 1 wherein said enabling step enables a user at a host computer to reconfigure the RAID arrangement and/or level of the disk array.

6. Apparatus for configuring a mass storage system, the system having a disk drive controller for receiving and sending data from and to a disk array and for receiving and sending data and commands from and to a host computer, the host computer being connected to the disk controller and the disk controller being able to configure the array in response to manually entered or modem entered commands from a personal computer, the apparatus comprising:

a communications path for communicating data from a host computer to the storage controller for storage in the storage array, a display for presenting to a user at the host computer, at a graphical user interface, a pictorial representation of interconnections betweens ports connected to the host computer and ports connected to the disk array, host input elements for enabling a user to modify the pictorial representation of the host computer to reconfigure the connections to the host computer and the disk array, the host communicating the modified configuration to the storage controller, and implementation software for implementing, at the storage controller, the modified disk array configuration.

7. Apparatus for configuring a mass storage system, the system having a disk drive controller for receiving and sending data from and to a disk array and for receiving and sending data and commands from and to a host computer, the host computer being connected to the disk controller and the disk controller being able to configure the array in response to manually entered or modem entered commands from a personal computer, the apparatus comprising:

a communications path for communicating data from a host computer to the storage controller for storage in the storage array, a display for presenting to a user at the host computer, at a graphical user interface, a pictorial representation of interconnections betweens ports connected to the host computer and ports connected to the disk array, host input elements for enabling a user to modify the pictorial representation of the host computer to reconfigure the connections to the host computer and the disk array, the host communicating the modified configuration to the storage controller, implementation software for implementing, at the storage controller, the modified disk array configuration, wherein the communications path includes software for using a modified diagnostic command of host computer to the storage controller for storage in the a bus protocol for a bus connecting the storage controller and the storage array, host to communicate the modified configuration from host to controller, and further comprising a storage for storing the modified configuration at the storage controller prior to implementing the modified configuration.

8. The apparatus of claim 7 further comprising software for updating, at the storage controller, the implemented modified configuration.

9. The apparatus of claim 8 further comprising storage at the controller and at the host computer for storing a copy of the disk configuration.

10. The apparatus of claim 6 wherein said host computer enables the user, at the host computer, to reconfigure the RAID arrangement and/or level of the disk array.

* * * * *